United States Patent
Kim et al.

(10) Patent No.: US 10,573,011 B2
(45) Date of Patent: Feb. 25, 2020

(54) TERMINAL AND METHOD OF CONTROLLING THEREFOR

(71) Applicant: LG ELECTRONICS INC., Seoul (KR)

(72) Inventors: Hangtae Kim, Seoul (KR); Kyungdong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 15/889,042

(22) Filed: Feb. 5, 2018

(65) Prior Publication Data

US 2018/0232894 A1 Aug. 16, 2018

(30) Foreign Application Priority Data

Feb. 10, 2017 (KR) .................. 10-2017-0018559

(51) Int. Cl.
*G06T 7/00* (2017.01)
*H04N 5/00* (2011.01)
(Continued)

(52) U.S. Cl.
CPC .............. *G06T 7/292* (2017.01); *G01S 3/00* (2013.01); *H04N 5/2258* (2013.01);
(Continued)

(58) Field of Classification Search
CPC .......................... G06T 7/292; H04N 5/232127
(Continued)

(56) References Cited

U.S. PATENT DOCUMENTS

2004/0041916 A1* 3/2004 Schibli ................ H04N 5/3454
348/207.99
2007/0039030 A1* 2/2007 Romanowich ... G08B 13/19608
725/105
(Continued)

FOREIGN PATENT DOCUMENTS

JP 2012114655 6/2012
KR 100743089 7/2007
(Continued)

OTHER PUBLICATIONS

PCT International Application No. PCT/KR2018/000899, Notification of Transmittal of the International Search Report and the Written Opinion of the International Searching Authority, or Declaration dated Apr. 30, 2018, 10 pages.

*Primary Examiner* — Jeffery A Williams
(74) *Attorney, Agent, or Firm* — Lee, Hong, Degerman, Kang & Waimey

(57) ABSTRACT

The present invention relates to a terminal and a method of controlling therefor. According to one embodiment of the present invention, a terminal includes at least two or more camera sensors, a preview window configured to include a first object to which a first focus is set by a first camera sensor and a second object to which a second focus is set by a second camera sensor and a display configured to display a processed image data, and a controller configured to track a movement of the first object, the controller, if the first object is deviated from an angle of view covered by the first camera sensor, configured to set a focus to the first object using the second camera sensor, the controller configured to obtain image data.

8 Claims, 15 Drawing Sheets

(51) Int. Cl.
- *G06T 7/292* (2017.01)
- *H04N 5/232* (2006.01)
- *H04N 5/225* (2006.01)
- *G01S 3/00* (2006.01)
- *H04N 5/247* (2006.01)
- *G06F 3/044* (2006.01)
- *G06F 3/041* (2006.01)

(52) U.S. Cl.
CPC ..... *H04N 5/23212* (2013.01); *H04N 5/23293* (2013.01); *H04N 5/23296* (2013.01); *H04N 5/232127* (2018.08); *H04N 5/232945* (2018.08); *H04N 5/247* (2013.01); *G06F 3/044* (2013.01); *G06F 3/0416* (2013.01); *G06F 2203/04102* (2013.01); *G06F 2203/04108* (2013.01)

(58) Field of Classification Search
USPC .......................................................... 348/169
See application file for complete search history.

(56) References Cited

U.S. PATENT DOCUMENTS

2008/0019566 A1\* 1/2008 Niem ................. G06K 9/00771
    382/103
2009/0096871 A1\* 4/2009 Kuwano ............ G06K 9/00228
    348/169

FOREIGN PATENT DOCUMENTS

| KR | 1020100010325 | 2/2010 |
| KR | 1020130096569 | 8/2013 |
| KR | 1020140102443 | 8/2014 |

\* cited by examiner

FIG. 7
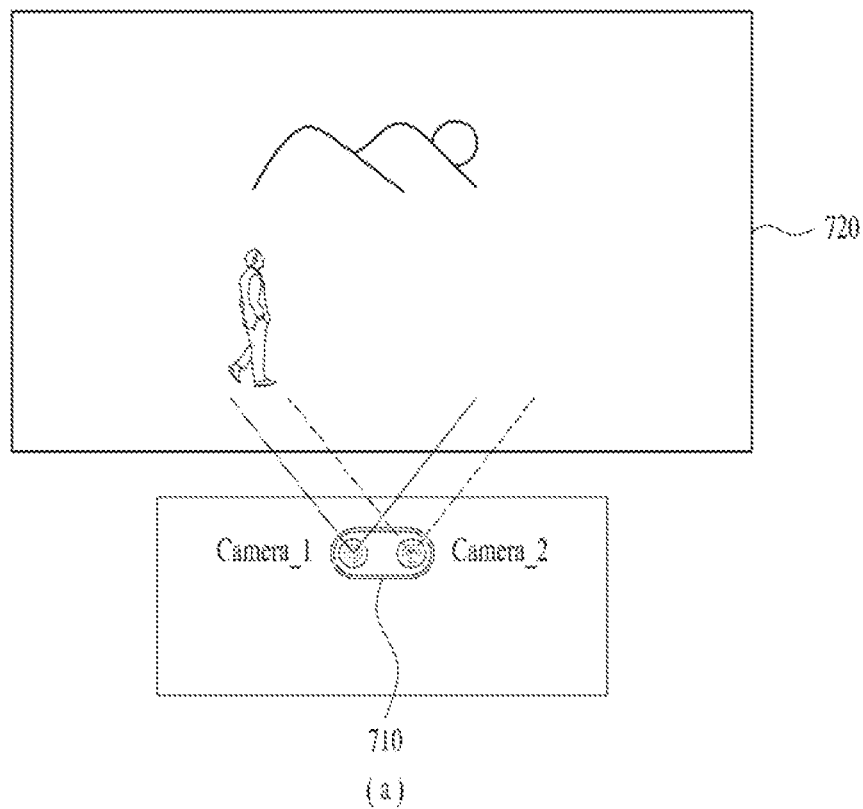
(a)
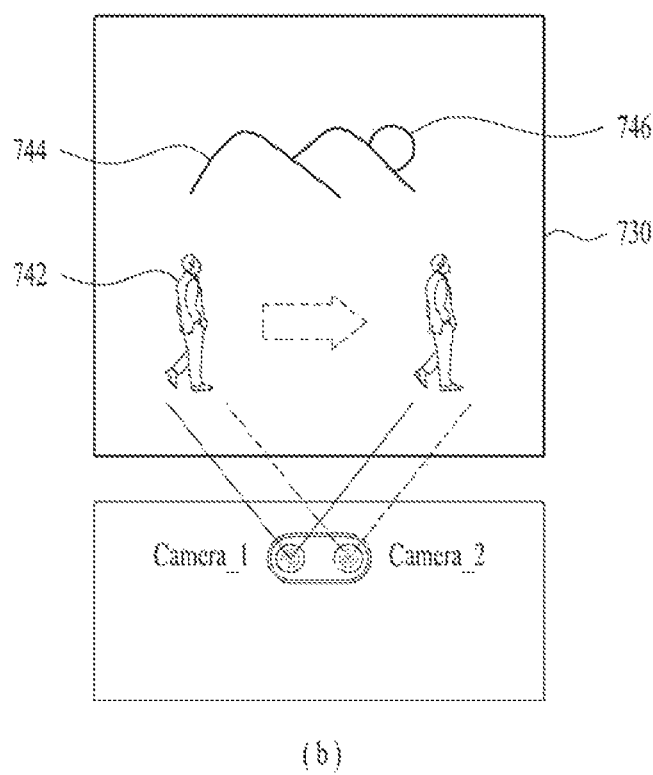
(b)

(a)             (b)

TERMINAL AND METHOD OF CONTROLLING THEREFOR

CROSS-REFERENCE TO RELATED APPLICATION

Pursuant to 35 U.S.C. § 119(a), this application claims the benefit of earlier filing date and right of priority to Korean Patent Application No. 10-2017-0018559, filed on Feb. 10, 2017, the contents of which are all hereby incorporated by reference herein in its entirety.

BACKGROUND OF THE INVENTION

Field of the Invention

The present invention relates to a terminal and a method of controlling therefor, and more particularly, to a terminal related to multi-focus and object tracking at the time of capturing an image and a method of controlling therefor.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As a mobile terminal such as a smartphone is equipped with a camera, an image sensor, and the like, effectiveness of a camera and a digital camera is gradually decreasing. Since image capturing using a mobile terminal is performed very often, a manufacturer of the mobile terminal intends to implement a camera, an image sensor, and the like of high specification and high definition in the mobile terminal in consideration of the image capturing using the mobile terminal.

In relation to this, when an image is captured using a mobile terminal, it may be difficult to capture a preferred image only due to a picture, an image, an object, etc. unwanted by a user. Although a sensor module of higher performance and higher definition is adopted compared to a legacy sensor module, it may be difficult to resolve the problem.

SUMMARY OF THE INVENTION

In order to resolve the problem or the inconvenience, one object of the present invention is to provide a terminal capable of obtaining an image preferred by a user using a plurality of focuses or multi-focus and an object tracking technology and a method of controlling therefor.

Another object of the present invention is to provide a terminal capable of obtaining an image preferred by a user via multiple focuses and focus switching between the multiple focuses and a method of controlling therefor.

The other object of the present invention is to provide a method of obtaining an image preferred by a user via a simple operation, a method of eliminating an unwanted object from the image, and a method of obtaining a high-definition image for an object preferred by a user based on the aforementioned contents.

Technical tasks obtainable from the present invention are non-limited the above mentioned technical tasks. And, other unmentioned technical tasks can be clearly understood from the following description by those having ordinary skill in the technical field to which the present invention pertains.

In the present specification, various embodiments for a terminal according to the present invention and a method of controlling therefor are disclosed.

To achieve these and other advantages and in accordance with the purpose of the present invention, as embodied and broadly described, a terminal includes at least two or more camera sensors, a preview window configured to include a first object to which a first focus is set by a first camera sensor and a second object to which a second focus is set by a second camera sensor and a display configured to display a processed image data, and a controller configured to track a movement of the first object, the controller, if the first object is deviated from an angle of view covered by the first camera sensor, configured to set a focus to the first object using the second camera sensor, the controller configured to obtain image data.

Technical solutions obtainable from the present invention are non-limited the above mentioned technical solutions. And, other unmentioned technical solutions can be clearly understood from the following description by those having ordinary skill in the technical field to which the present invention pertains.

Accordingly, the present invention provides the following effects or advantages.

According to one embodiment among various embodiments of the present invention, it is able to provide a terminal capable of obtaining an image preferred by a user using a plurality of focuses or multi-focus and an object tracking technology and a method of controlling therefor.

According to one embodiment among various embodiments of the present invention, it is able to provide a terminal capable of obtaining an image preferred by a user via multiple focuses and focus switching between the multiple focuses and a method of controlling therefor.

According to one embodiment among various embodiments of the present invention, it is able to obtain an image preferred by a user via a simple operation, eliminate an unwanted object from the image, and obtain a high-definition image for an object preferred by a user based on the aforementioned contents.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a diagram for a preview window provided to a terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
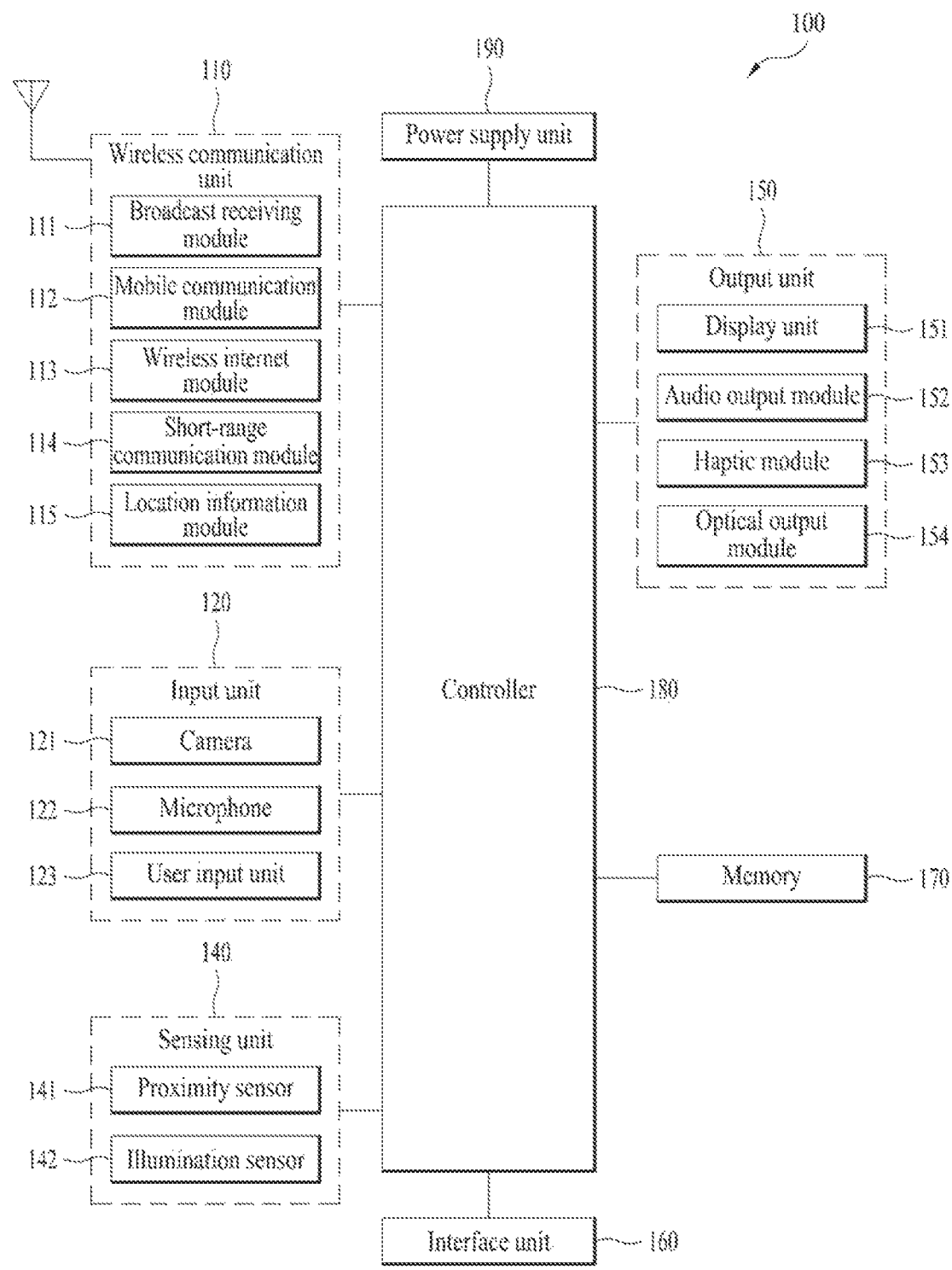
FIG. 1A is a block diagram of a mobile terminal in accordance with the present disclosure.
Figure 1B:
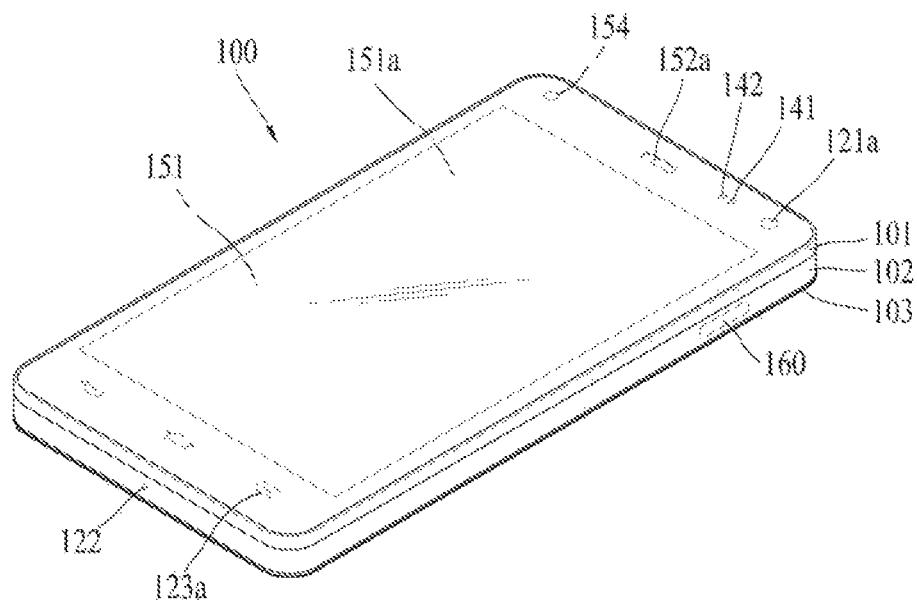
FIGS. 1B and 1C are conceptual views of one example of the mobile terminal, viewed from different directions.
Figure 1C:
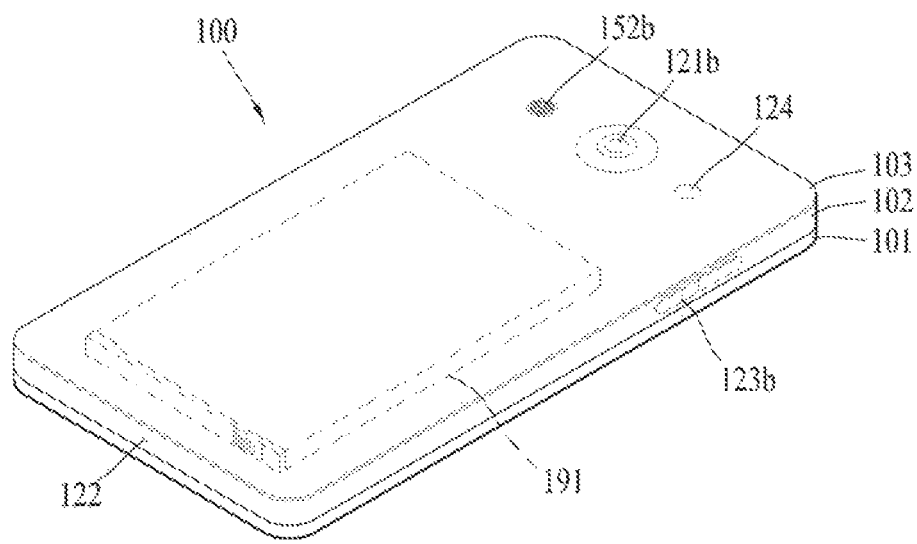

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
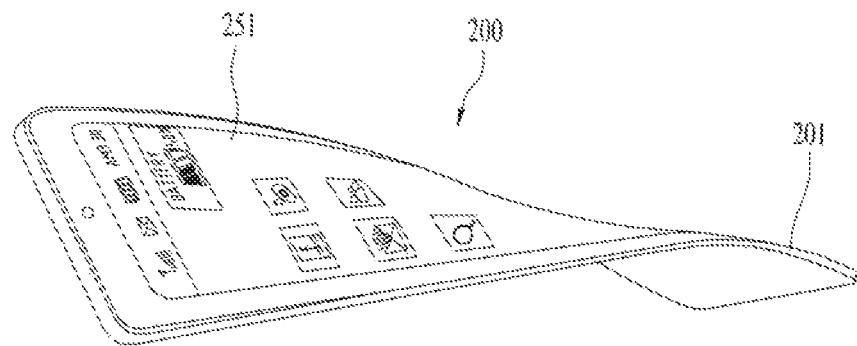
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
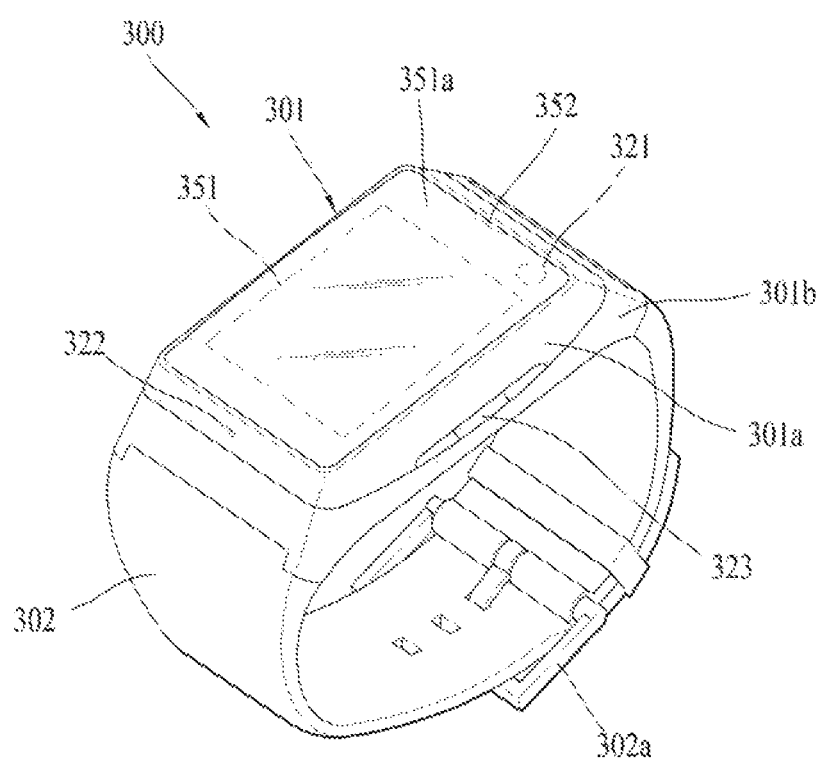
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 4:
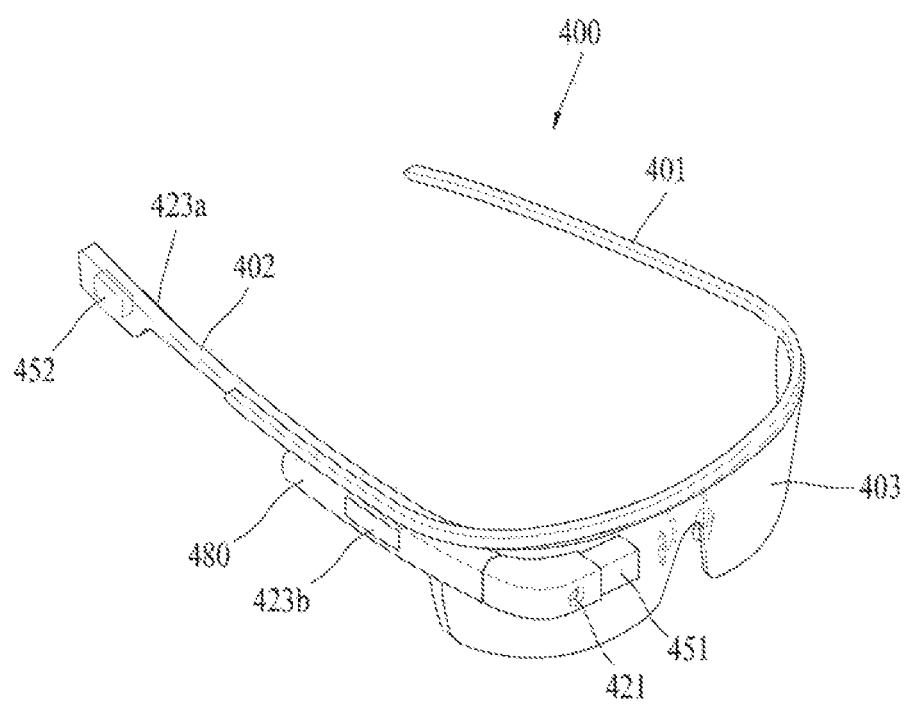
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e.g., a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 5:
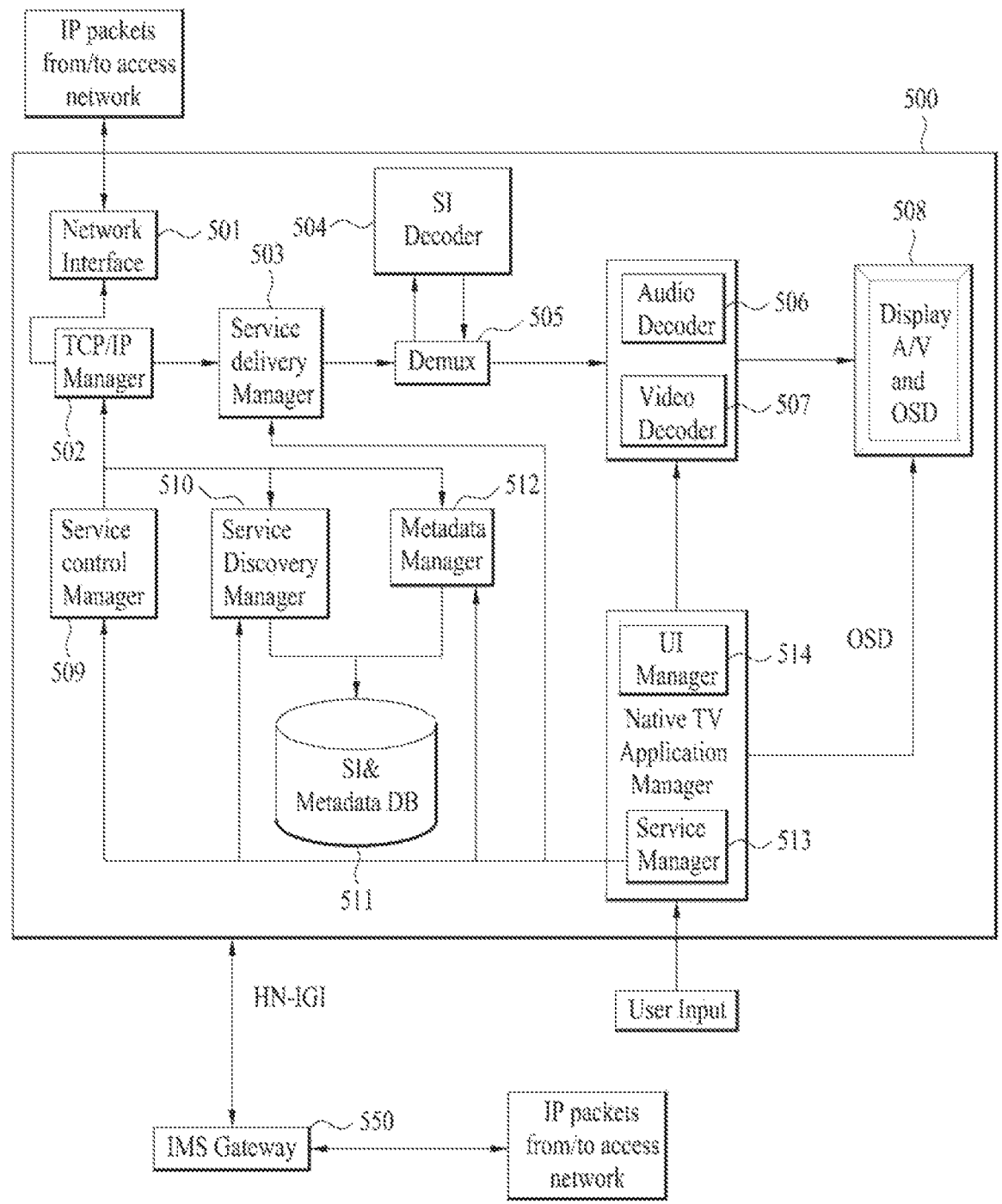
FIG. 5 is a block diagram showing a digital device according to one embodiment of the present invention.

FIG. 5 is a schematic diagram of a digital receiver 500 according to an embodiment of the present invention.

The digital receiver 500 may include a network interface 501, a TCP/IP manager 502, a service delivery manager 503, an SI (System Information, Service Information or Signaling Information) decoder 504, a demultiplexer 505, an audio decoder 506, a video decoder 507, a display A/V and OSD (On Screen Display) module 508, a service control manager 509, a service discovery manager 510, a SI & metadata database (DB) 511, a metadata manager 512, an application manager, etc.

The network interface 501 may receive or transmit IP packets including service data through a network. In other words, the network interface 501 may receive IP packets including at least one of text data, image data, audio data, and video data, used for SNS, as well as services and applications from a server connected thereto through a network.

The TCP/IP manager 502 may involve delivery of IP packets transmitted to the digital receiver 500 and IP packets transmitted from the digital receiver 500, that is, packet delivery between a source and a destination. The TCP/IP manager 502 may classify received packets according to an appropriate protocol and output the classified packets to the service delivery manager 505, the service discovery manager 510, the service control manager 509, and the metadata manager 512.

The service delivery manager 503 may control classification and processing of service data. The service delivery manager 503 may control real-time streaming data, for example, using real-time protocol/real-time control protocol (RTP/RTCP). In other words, the service delivery manager 503 may parse a real-time streaming data packet, transmitted on the basis of the RTP, according to the RTP and transmits the parsed data packet to the demultiplexer 505 or store the parsed data packet in the SI & metadata DB 511 under the control of the service manager 513. The service delivery manager 503 can feed back network reception information to the server on the basis of the RTP.

The demultiplexer 505 may demultiplex audio data, video data, SI from a received packet through packet identifier (PID) filtering and transmit the demultiplexed data to corresponding processors, that is, the audio/video decoder 506/507 and the SI decoder 204.

The SI decoder 504 may parse and/or decode SI data such as program specific information (PSI), program and system information protocol (PSIP), digital video broadcast-service information (DVB-SI), etc.

The SI decoder 504 may store the parsed and/or decoded SI data in the SI & metadata DB 511. The SI data stored in the SI & metadata DB 511 can be read or extracted and used by a component which requires the SI data. EPG data can also be read from the SI & metadata DB 511. This will be described below in detail.

The audio decoder 506 and the video decoder 507 respectively may decode audio data and video data, which are demultiplexed by the demultiplexer 505. The decoded audio data and video data may be provided to the user through the display unit 508.

The application manager may include a service manager 513 and a user interface (UI) manager 514, administrate the overall state of the digital receiver 500, provides a UI, and manage other mangers.

The UI manager 514 can receive a key input from the user and provide a graphical user interface (GUI) related to a receiver operation corresponding to the key input through OSD.

The service manager 513 may control and manage service-related managers such as the service delivery manager 503, the service discovery manager 510, the service control manager 509, and the metadata manager 512.

The service manager 513 may configure a channel map and enable channel control at the request of the user on the basis of the channel map.

The service manager 513 may receive service information corresponding to channel from the SI decoder 504 and set audio/video PID of a selected channel to the demultiplexer 505 so as to control the demultiplexing procedure of the demultiplexer 505.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 500 may provide a service (for example, SNS) through an image on the screen, the digital receiver 500 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 500 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 510 may provide information required to select a service provider that provides a service. Upon receipt of a signal for selecting a channel from the service manager 513, the service discovery manager 510 discovers a service on the basis of the received signal.

The service control manager 509 may select and control a service. For example, the service control manager 509 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 512 may manage metadata regarding services and store metadata in the SI & metadata DB 511.

The SI & metadata DB 511 may store SI data decoded by the SI decoder 504, metadata managed by the metadata manager 512, and information required to select a service provider, which is provided by the service discovery manager 510. In addition, the SI & metadata DB 511 can store system set-up data.

An IMS (IP Multimedia Subsystem) gateway 550 may include functions required to access an IMS based IPTV services.

Figure 6:
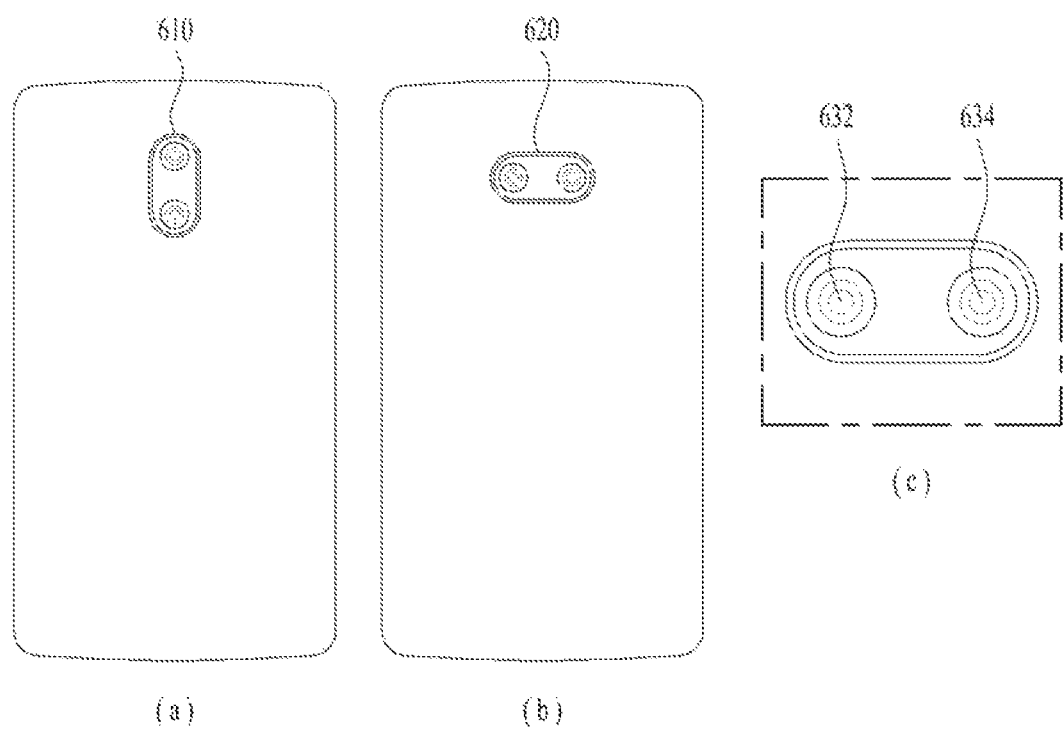
FIG. 6 is a diagram for explaining an example that two camera sensors are mounted on a terminal according to the present invention.

FIG. 6 is a diagram for explaining an example that two camera sensors are mounted on a terminal according to the present invention.

FIGS. 6a and 6b show an example that a camera module including two camera sensors is vertically installed in a terminal and an example that a camera module including two camera sensors is horizontally installed in the terminal, respectively. Meanwhile, although it is not depicted, it is able to control the states shown in FIGS. 6a and 6b to be randomly switched according to an object to be captured by the camera module, an inclination of the terminal, an angle of the terminal, and the like.

Meanwhile, FIG. 6c shows a magnified camera module of the camera module 610/620 of the terminal shown in FIGS. 6a and 6b. It is able to check that the magnified camera module includes two camera sensors 632/634.

In relation to this, if a camera module is implemented by dual camera sensors, a first camera sensor 632 and a second camera sensor 634 can be implemented by a narrow angle and a wide angle, respectively, by which the present invention may be non-limited.

FIG. 7 is a diagram for a preview window provided to a terminal according to one embodiment of the present invention.

Referring to FIG. 7a, if a camera application is activated, a camera module 710 mounted on a terminal is changed to a state capable of capturing an image and may be able to capture an image of a background 720 on the basis of an angle of view of a first and/or a second camera sensor.

Referring to FIG. 7b, an image of a background 720 is provided to a screen of a terminal in a form of a preview via a preview window 730 using the camera module 710. In this case, for example, FIGS. 7a and 7b indicate a state that an image is not captured yet, although the camera application is activated. As shown in FIG. 7b, the capturing means to obtain the image of the background by a user selection and the like in a state that an image is provided via the preview window 730. Hence, when it is represented as an image is 'obtained' rather than 'captured', the image can also include the image provided via the preview window 730.

Referring to FIG. 7b, the preview window 730 provided by the terminal provides a preview image obtained from the background image 720 shown in FIG. 7a. In this case, the preview window 730 can include at least one object selected from the group consisting of a first object 742, a second object 744, and a third object 746. In this case, the object corresponds to an object of a general meaning. Yet, it is not mandatory to include an object in a preview image or a captured image.

Figure 8:
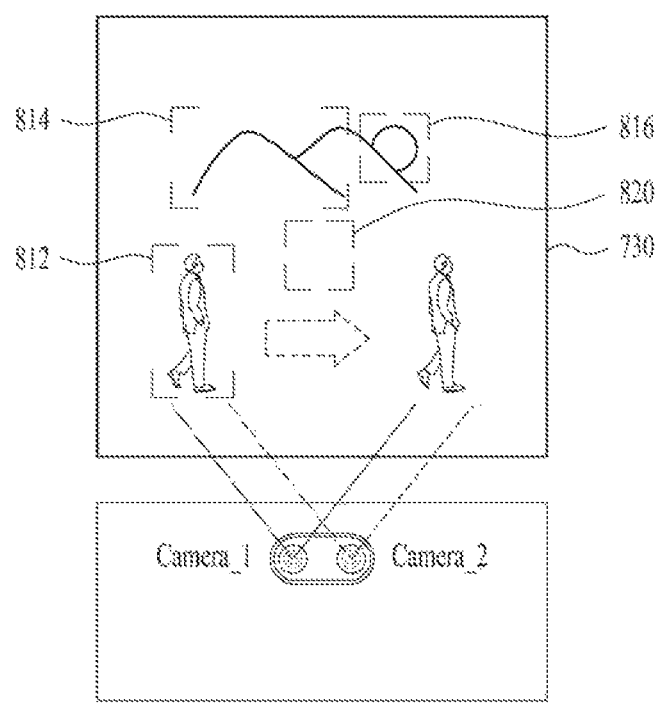
FIG. 8 is a diagram for explaining a preview window of a terminal including a focus according to the present invention.

FIG. 8 is a diagram for explaining a preview window of a terminal including a focus according to the present invention.

In general, when a preview image provided via a preview window 730, object(s) included in the preview image may respectively become a focus target 812/814/816 of each of camera sensors included in a camera module. Yet, it is not mandatory that an object becomes a focus target 812/814/816. For example, although there is no object at the center of the preview window 730 in FIG. 7b, it may be able to provide a focus 820 at the center of the preview window 730. When a dictionary definition of a focus related to a camera sensor is considered, it is natural.

Referring to FIG. 7b, the preview window 730 of the terminal includes 3 objects 742/744/746. In this case, the objects include a fixed object and a moving object. The moving object literally means an object including a movement among objects and the rest of objects correspond to a fixed object.

The present invention explains a focus control on the fixed object and the moving object among the objects.

In general, a camera sensor focuses on a single point by physically moving a lens in z axis. For example, when an image of a close background is captured, no problem may occur depending on a depth of a camera. However, when an image of a far background is captured, it may be able to fix a focus focusing on a preferred point only among the close background and the far background.

In relation to this, according to the present invention, when a terminal on which two camera sensors, i.e., dual camera, are mounted has 2 physical focuses, although the terminal captures an image of a far background, the terminal can focus on both a close background and the far background via the 2 physical focuses.

The terminal may operate as follows. For example, the terminal captures a fixed type focus area and eliminates a tracking type focus area to obtain an image preferred by a user only by eliminating an object or a background not preferred by the user. As a different example, the terminal captures all focused areas. Regarding this, it shall be explained in more detail in a corresponding part.

When a camera sensor is activated in the terminal and a focus is provided on a preview window, the focus is continuously maintained irrespective of a movement of an object until a capturing signal is received. Or, the focus is continuously maintained for a fixed object and the focus is continuously changed for a moving object according to a movement of the moving object. Yet, in this case, although a position of the focus is changed, a target of the focus is not changed.

If a capturing signal is finally received, the terminal captures an image on the basis of a focus among multiple focuses or a selected focus.

Figure 9:
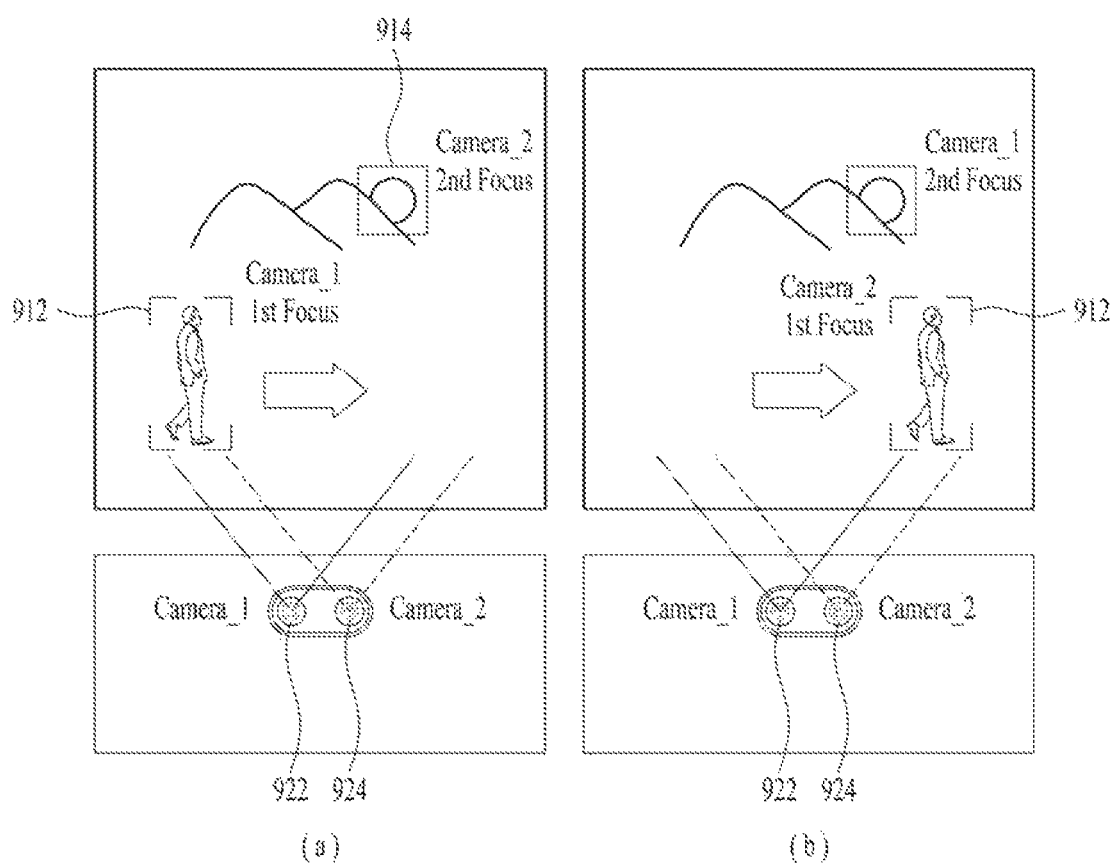
FIG. 9 is a diagram for explaining a method of processing a focus according to one embodiment of the present invention.

FIG. 9 is a diagram for explaining a method of processing a focus according to one embodiment of the present invention.

If a moving object is included in objects which are included in a preview image of a preview window, it is necessary to continuously track the moving object. To this end, according to the present invention, it is able to actively change a focus according to an area capable of being captured by each of camera sensors constructing a camera module of a terminal.

FIG. 9 shows an example for a method of eliminating an unwanted object when an image is captured via a terminal using multiple focuses and an object tracking technology.

As shown in FIG. 9, it may be able to capture a background image preferred by a user via a terminal. In this case, due to unintended persons, the background image capturing can be interrupted. Yet, the user of the terminal may not want to wait until involvement of an unintended object is gone. Hence, in this situation, if it is able to eliminate an unwanted object from an image after the image is captured, the problem mentioned above can be resolved.

In the following, a method of eliminating an unwanted object from an image captured by a terminal is explained.

As mentioned in the foregoing description, although there exist 3 objects on the preview image in FIG. 9, for clarity, 2 objects are considered only. And, assume that the terminal focuses on the 2 objects.

Referring to FIG. 9a, assume that a background image includes a first object (person) 912 and a second object (rising sun) 914 and the terminal focuses on the first object 912 and the second object 914. Meanwhile, as shown in FIG. 9b, assume that the first object 912 of the background image corresponds to a moving object and the first object horizontally moves from the left to the right over time.

According to the present invention, a camera focus is actively changed according to areas captured by a first camera sensor 922 and a second camera sensor 924 to continuously track the movement of the moving object. In this case, for example, the area captured by the camera sensor may include an angle of view of each camera such as a narrow angle, a wide angle, and the like.

Referring to FIGS. 9a and 9b, the controller of the terminal sets a first focus to an unwanted object or an object to be eliminated from a background image via the first camera and sets a second focus to such an object as sunrise/sunset to be captured from the background image via the second camera.

The controller of the terminal internally captures an image while a camera sensor capturing setting such as an aperture value, shutter speed, ISO, brightness, etc. is set to obtain a captured image and eliminates the object to which the first focus is set via the first camera from the captured image. After the object to which the first focus is set is eliminated, it may be able to obtain a final image on the basis of the second focus focused via the second camera.

As mentioned in the foregoing description, if an image is processed according to a focus, although a focused object corresponds to a moving object, it may be able to obtain a final image not influencing on obtaining a focused image.

Meanwhile, in the foregoing description, an angle of view of the first camera and an angle of view of the second camera may or may not be identical to each other. When the angle of view of the first camera is different from the angle of view of the second camera, one angle of view of a camera corresponds to a narrow angle and another angle of view of a different camera may corresponds to a wide angle.

And, the first focus may correspond to a tracking focus and the second focus may correspond to a lock focus, by which the present invention may be non-limited. In this case, for example, when a focused object corresponds to a moving object and the object continuously moves over time, the tracking focus focuses on the moving object in a manner of tracking the moving object. The tracking focus can be applied not only to the continuously moving object but also to an unwanted or not selected object. And, the lock focus corresponds to a focus fixed to a specific point of a background image irrespective of the passage of time or a moving object. The lock focus does not track the moving object.

According to the present invention, when a captured image is obtained, an object on which the tracking focus is focused is eliminated from the captured image and the image is processed on the basis of the lock focus. Moreover, the present invention can also process the following.

For example, as shown in FIG. 9a, when the controller of the terminal sets the tracking focus to a first object 912 and sets the lock focus to a second object 914, if the first object 912 moves as time passes, the controller can control cameras, which have set the focuses, to be changed.

For example, referring to FIG. 9a, a first focus focused on the first object 912 is set by a first camera 922 and a second focus focused on the second object 914 is set by a second camera 924.

In this case, for example, if the first object 912 to which the first focus is set is deviated from a capturing area (i.e., angle of view) of the first camera 922, it is necessary to reconfigure processing of the first object 912-1.

For example, if the first object 912 exists within the angle of view of the first camera, the first focus is continuously maintained. However, if the first object 912-1 is deviated from the angle of view of the first camera according to a movement of the first object, it may not be necessary to maintain the first focus. Hence, in this case, the controller of the terminal changes the first focus focused on the first object 912-1 via the first camera 922 to the second focus set via the second camera 924. In this case, when a camera and a focus on the first object 912-1 are changed to the second camera 924 and the second focus from the first camera 922 and the first focus, the controller of the terminal controls the second focus of the second camera 924 to continuously function as a tracking focus rather than a lock focus. Hence, the first focus is focused on the second object 914 via the first camera 922 instead of the second focus of the second camera 924 and the first focus continuously maintains the lock focus instead of being changed to the tracking focus.

If the first object 912-1 is even deviated from the angle of view covered by the second camera, the controller of the terminal cancels the previously changed focus and can control the focus not to be provided.

In summary, a camera and a focus of the camera focused on an object can be changed in consideration of a movement of the object and an angle of view covered by each camera. Yet, although a camera and a focus are physically changed, a focus attribute for an object can be maintained as it is.

In particular, if a focus of a first camera is used only when a first object moves, and the focus is canceled when the first object is deviated from an angle of view of the first camera, as mentioned in the foregoing description, although the first object is eliminated from an image at the time of obtaining the image via a second focus of a second camera for a second object, the first object can be included in the image in a state that the first object is not focused, when an angle of view of the second camera is relatively wider than the angle of view of the first camera. In other word, if the first object is positioned at the outside of the angle of view of the first camera or is positioned at the inside of the angle of view of the second camera, although the first object is not focused by both the first and the second camera, since the first object is still positioned at the inside of the angle of view of the second camera, it is very difficult to eliminate a part corresponding to the first object from an image which is obtained on the basis of an image lock focused by the second camera. Hence, when the first object is deviated from the angle of view of the first camera, it is necessary to have a procedure for determining whether or not the first object is positioned at the inside of the angle of view of the second camera. By doing so, it is able to conveniently and precisely eliminate an unwanted object from a finally obtained image, thereby increasing convenience in editing and the like.

Figure 10:
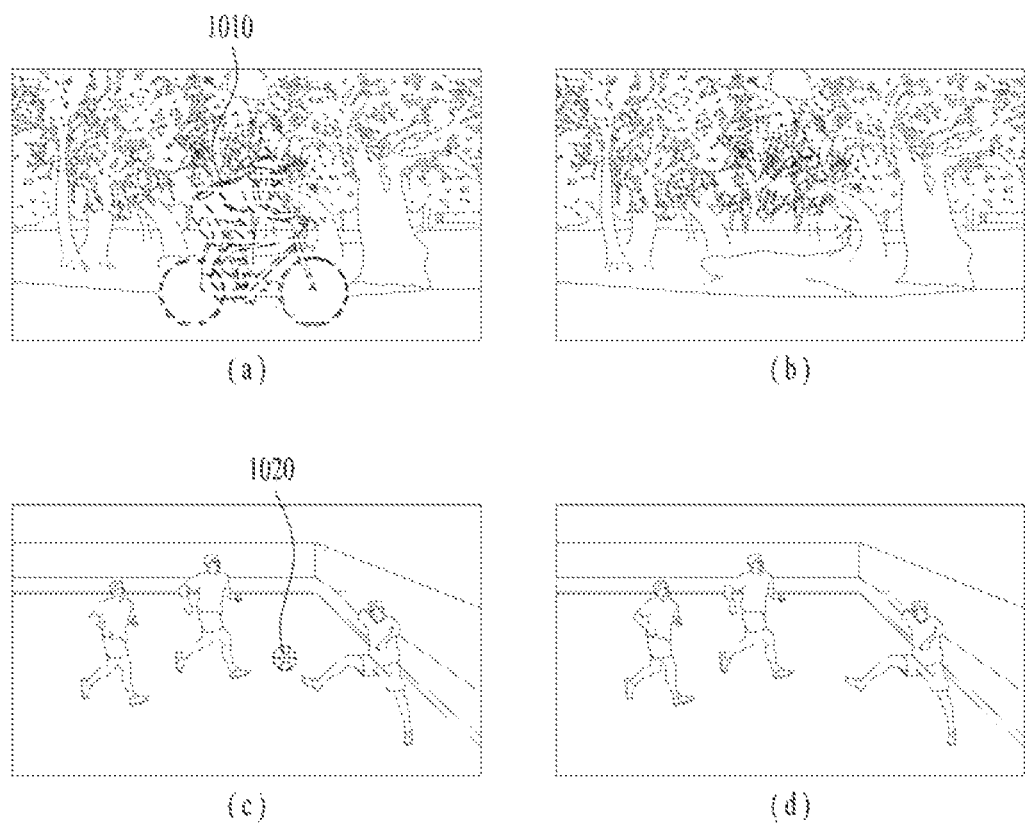
FIG. 10 is a diagram for explaining a first image and a second image associated with an image processing method according to one embodiment of the present invention.

According to an image processing method in accordance with one embodiment of the present invention, a first image and a second image are shown in FIG. 10. The first image corresponds to images shown in FIGS. 10*a* and 10*c* and images from which an unwanted object 1010/1020 is not eliminated yet. The second image corresponds to images shown in FIGS. 10*b* and 10*d* and final edited images from which the unwanted object 1010/1020 is eliminated.

In the following, a method of processing an image according to multiple focuses is explained in accordance with the present invention.

Figure 11:
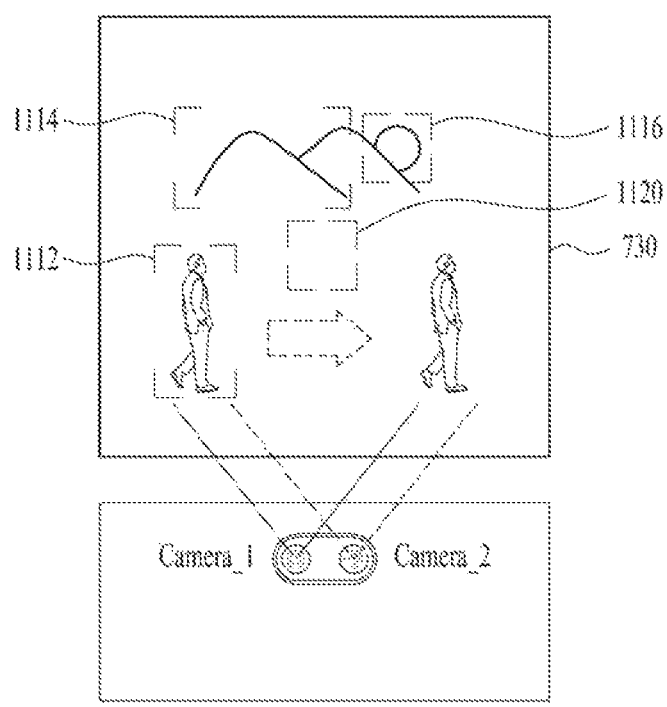
FIG. 11 is a diagram for explaining an image processing method based on multiple focuses according to one embodiment of the present invention.

FIG. 11 is a diagram for explaining an image processing method based on multiple focuses according to one embodiment of the present invention.

Referring to FIG. 11, a background image is obtained via one or more camera sensors. In this case, multi-focus is applied. As mentioned in the foregoing description, a camera sensor may have at least one focus.

For clarity, a method of obtaining and processing an image via multiple focuses provided by dual camera sensors is explained in the following, by which the present invention may be non-limited.

Referring to FIG. 11, it may have 4 focuses in total via a dual camera. As mentioned in the foregoing description, in general, it may have a focus in an object unit in a background, by which the present invention may be non-limited. For example, there may exist a center focus 1120 not related to an object of FIG. 11, a focus area selected by a user irrespective of an object, and the like.

In the foregoing description, a first focus and a second focus are defined as a tracking focus and a lock focus, respectively. An image processing method for eliminating an object focused by the tracking focus from an image obtained on the basis of the lock focus has been explained in the foregoing description.

In the following, a method of obtaining images as many as the number of multiple focuses according to a single action or input of a user is explained. In this case, the aforementioned tracking focus and the lock focus can be still used.

Basically, referring to FIG. 11, if a capturing signal is received, a terminal can obtain images as many as the number of focuses capable of being focused at the time of receiving the capturing signal.

In this case, each of the obtained images may correspond to an image captured on the basis of a corresponding focus. Hence, the images obtained as many as the number of focuses may correspond to image data not perfectly identical to each other.

In this case, among multiple focuses, the terminal processes and provides an image based on a focus of top priority as a basic image according to a selection of a user or a predetermined configuration and the remaining images can be processed as auxiliary images. The auxiliary images may not be provided in the beginning.

Images are divided into the basic image and the auxiliary image to identify a capturing intention of a user and prevent inconvenience and confusion of the user in selecting an image due to too many images provided by the terminal.

The auxiliary image can be provided according to a selection of the user. For example, when an editing command for the basic image is received and the image is edited in response to the editing-related command, the auxiliary image can be used for maintaining the quality of the basic image.

Meanwhile, when the images as many as the number of focuses are obtained, if at least one moving object exists, as mentioned in the foregoing description, the terminal can set a tracking focus to the moving object. And, if the moving object to which the tracking focus is set is positioned within angles of view of all cameras of the terminal, it may be able to continuously obtain a plurality of images according to a movement of the moving object using a single capturing signal or a capturing command.

For example, as shown in FIG. 11, if a first object 1112 horizontally moves, the controller of the terminal can control the first object 1112 to be captured in a unit of prescribed time using a first camera according to a single capturing command instead of capturing the first object one time only.

In this case, if the first object 1112 is deviated from an angle of view of the first camera according to the horizontal movement of the first object but the first object is positioned within an angle of view of a second camera, as mentioned in the foregoing description, the first object 1112 can be continuously captured using a focus of the second camera rather than the first camera.

Meanwhile, if there is no predetermined or selected focus and a capturing mode of the terminal corresponds to a still image mode, the terminal automatically configures one of fixed objects 1114/1116 or a center focus 1120 as a basic focus among multiple focuses to obtain an image. If the capturing mode corresponds to a video mode, the terminal automatically configures the moving object 1112 as the basic focus to obtain an image. Yet, the present invention is not restricted by the aforementioned examples.

Although the capturing mode corresponds to the still image mode, if an image is selected by a user or an image is provided via a window of the terminal, the terminal can provide images having multiple focuses in a form of a slide show with a prescribed time interval. In this case, when the slide show is provided, it may be able to make a user feel a still image, a slow video, or a 3D effect by appropriately controlling the time interval.

The terminal may generate a single image by combining images obtained according to each focus and may be able to provide the image as an image according to multiple focuses.

Meanwhile, when each camera is able to provide multiple focuses including two or more focuses and a partial focus is focused on the preview window of the terminal only, the number of focuses and positions of the focuses can be randomly configured and changed according to a selection of the partial focus.

Figure 12:
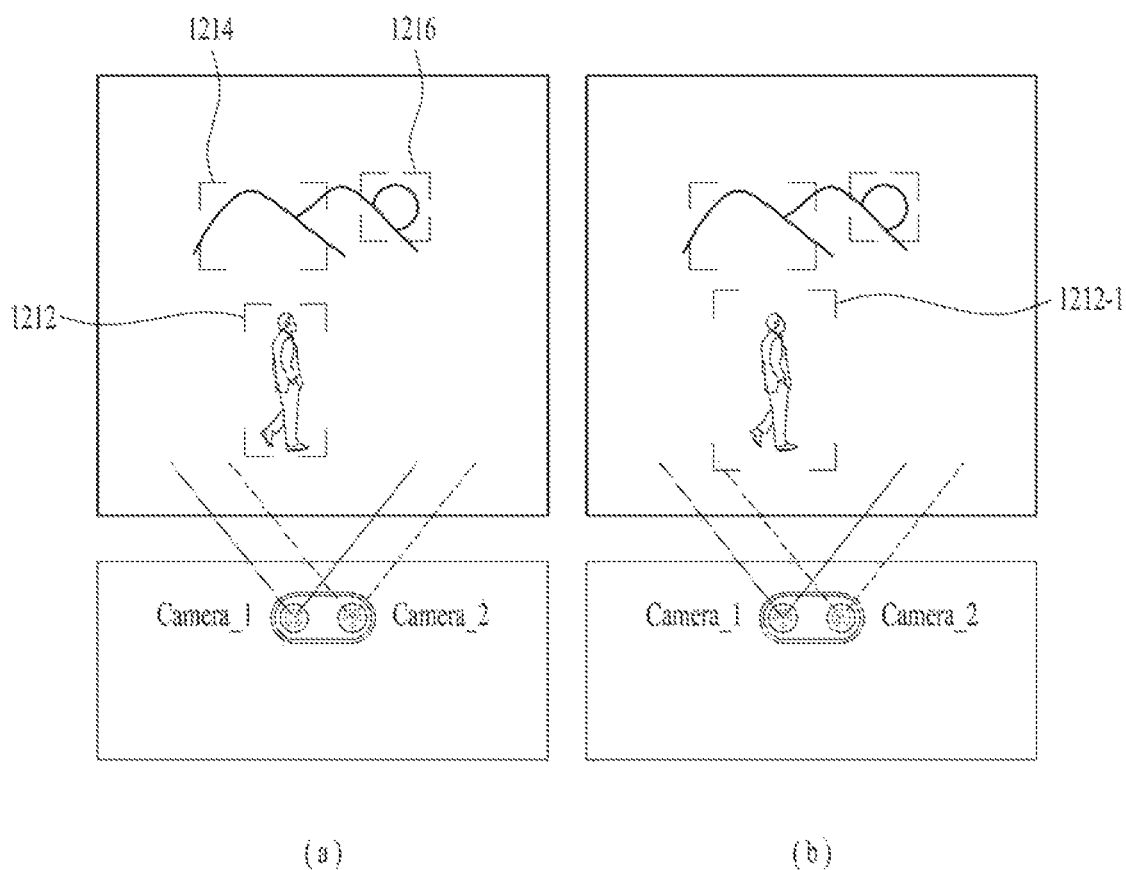
FIG. 12 is a diagram for explaining an image processing method based on focus control according to one embodiment of the present invention.

FIG. 12 is a diagram for explaining an image processing method based on focus control according to one embodiment of the present invention.

FIG. 12a is a diagram for multiple focuses on a preview window provided on a display when a camera application is executed in a terminal and a camera module is activated and FIG. 12b is a diagram for a case of performing focus control in FIG. 12a.

Referring to FIG. 12a, a terminal automatically focuses on a background image via a preview window. In other word, referring to FIG. 12a, there are 3 focuses 1212/1214/1216 configured by a first camera and a second camera on the preview window.

In this case, the terminal selects a specific focus of the background image provided on the preview image according to an action of a user, an input, or a configuration of the terminal to magnify or reduce a range of the focus. Or, the terminal selects the background image itself or a part (an area) of the background image and may be able to zoom-in or zoom-out the background image itself or the part (an area) of the background image. For clarity, the aforementioned contents are referred to as focus control.

According to the present invention, if a focus control signal is received, the terminal can perform various controls including changing a focus, changing a camera, which has focused on a corresponding object, adding or deleting a focus, changing resolution, changing an image size, and the like.

For example, if a zoom-in or zoom-out signal is received after a first object 1212 is selected from the preview window, as shown in FIG. 12b, the terminal can change a focus range of the first object 1212-1 and provide the changed focus range to the preview window.

For clarity, FIG. 12 illustrates a zoom-out case. As shown in the drawing, if a focus range is changed (magnified), the focus range-changed object 1212-1 can be configured as a basic image. And, it may be able to control a plurality of images to be obtained from the object 1212-1 via multiple shots according to a capturing signal. And, it may be able to control a focus not related to the object 1212-1, a focus positioned at the outside of a prescribed range from the object 1212-1, a focus not overlapped by the focus range change to be eliminated. Besides, it may be able to obtain an image by applying a HDR (high dynamic range) to a focus range part only of the object 1212-1 or by controlling the focus range part to be differently configured in a manner of configuring a camera setting such as resolution, brightness, ISO, and the like as a professional level. Although it is not depicted, various configurations can be performed on the object 1212-1. For example, the object 1212-1 may rotate or a size of the object can be changed in the background image. If a focus range is changed, it may be able to control a focus attribute for the object to be randomly changed or not changed. In this case, it may be able to differently control the object according to whether the object corresponds to a moving object or a fixed object. As mentioned in the foregoing description, it may be able to change a focus configuration by changing a camera according to a movement of an object.

Although contents are not depicted or explained herein, if the contents are similar to the aforementioned contents, the image processing method according to the present invention can also be applied to the contents.

As mentioned in the foregoing description, the terminal can process image data in various ways in a manner of associating a zoom-in or zoom-out signal with a focus.

Figure 13:
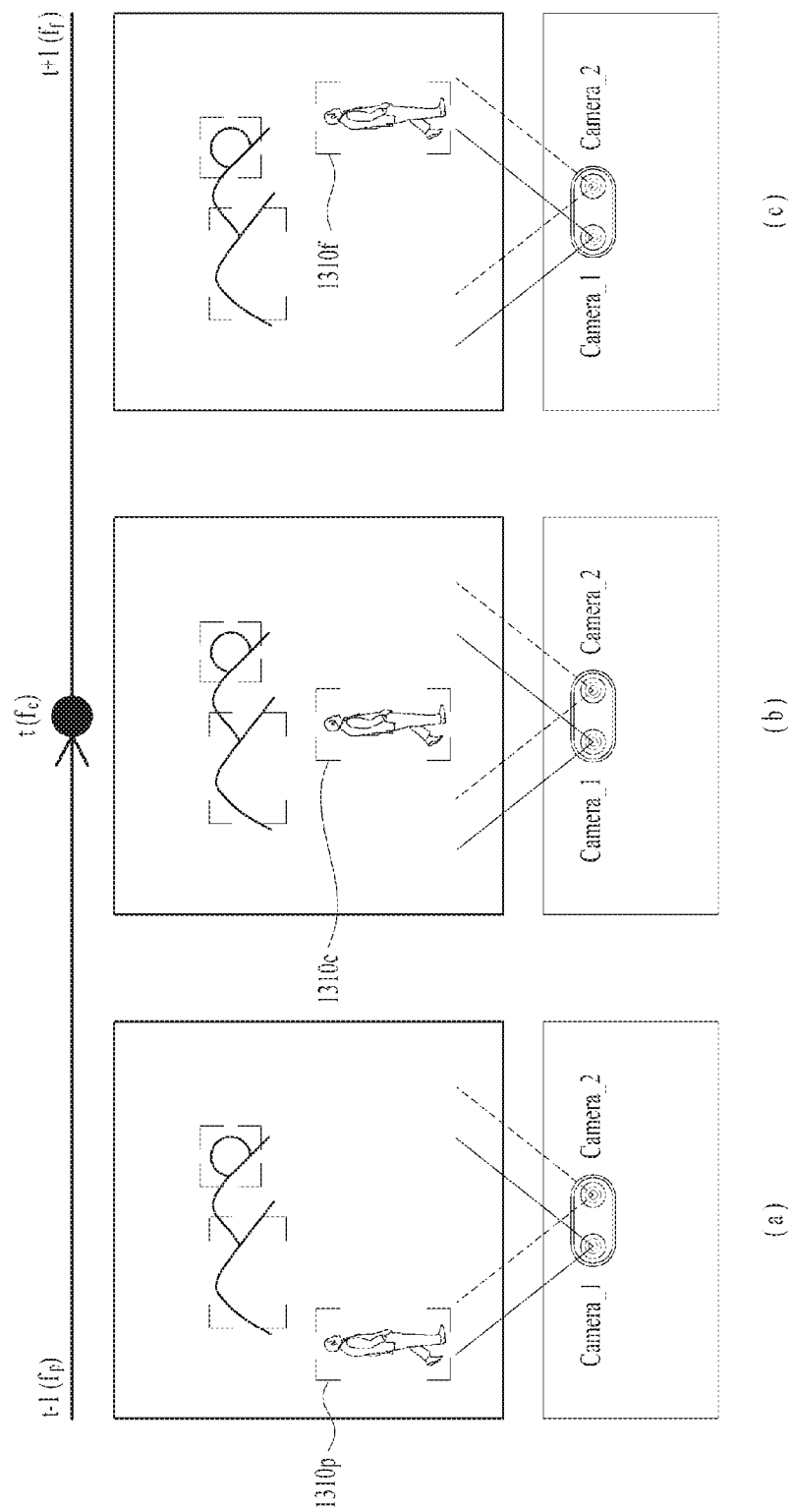
FIG. 13 is a diagram for explaining an image processing method according to a different embodiment of the present invention.

FIG. 13 is a diagram for explaining an image processing method according to a different embodiment of the present invention.

In FIG. 13, FIG. 13a corresponds to past and FIG. 13c corresponds to future on the basis of FIG. 13b. In this case, although FIG. 13b becomes a reference on the basis of current time, FIG. 13b may also become a reference on the basis of timing at which a capturing signal is received.

Meanwhile, in FIG. 13, assume that a camera application is manually or automatically executed in a terminal and a preview window is provided according to the camera application.

For clarity, in FIG. 13, timing at which a capturing signal is received (t), past (t−1), and future (t+1) are explained on the basis of time shown at the top of FIG. 13, by which the present invention may be non-limited.

For example, it may use a frame unit (fc, fp, and ff) instead of the time unit. Meanwhile, a time interval between t, t−1, and t+1 (frame interval when frame unit is used) may follow a configuration. It is not mandatory that a time interval is identical to each other. There may exist a short time interval and a long time interval.

For clarity, FIGS. 13a to 13c are depicted in FIG. 13 to respectively show one past and one future only on the basis of FIG. 13b, by which the present invention may be non-limited. A time interval or a frame interval may have an identical interval or a random interval.

Referring to FIG. 13a, if a camera application is executed, a terminal provides a preview window. A plurality of objects and a plurality of focuses corresponding to a plurality of the objects can be set to the preview window. For clarity, an object 1310p is explained as an example in the present invention.

Referring to FIG. 13a, an object 1310p (1310 previous) is positioned at the left on the basis of a horizontal axis on the preview window.

Referring to FIG. 13b, an object 1310c (1310 current) is positioned at the center on the basis of the horizontal axis on the preview window. This indicates that the object has moved horizontally compared to FIG. 13a.

Referring to FIG. 13c, an object 1310f (1310 future) is positioned at the right on the basis of the horizontal axis on the preview window. This also indicates that there is a horizontal movement compared to FIGS. 13a and 13b.

In this case, as mentioned in the foregoing description, FIG. 13b shows a case that a capturing signal is received at time t.

In other word, as shown in FIG. 13b, if a capturing signal is received at a specific timing t, a terminal can control background images of previous timing and future timing as well as a background image of the timing t to be obtained.

In this case, previous time of the specific timing t corresponds to a time period between the timing at which the camera application is executed or the timing at which the preview window is provided on the terminal according to the execution of the camera application and the specific timing t shown in FIG. 13b, i.e., the timing at which the capturing signal is received. In this case, an image at a prescribed timing can be obtained as a background image of a previous timing according to the time interval, a specific time unit, or a predetermined configuration.

Meanwhile, future time of the specific timing t corresponds to a predetermined time interval after the specific timing. The future time may correspond to a time interval corresponding to the previous time of the specific timing. Or, the future time of the specific timing t may correspond to a time period until an additional signal is received after the specific timing. For example, if a user inputs an additional input or gesture or moves the terminal to make a slope of the terminal exceed a predetermined threshold, the future time may correspond to a time interval until then.

Meanwhile, for example, the contents mentioned earlier in FIG. 13 can be performed only when an object corresponds to a moving object or there is a configuration or request.

Or, for example, the previous time of the specific timing t corresponds to a time period starting from timing at which an object enters an angle of view of the first camera. For example, the future time of the specific timing t corresponds to a time period ended before timing at which an object is deviated from an angle of view of the second camera. In this case, as mentioned in the foregoing description, a focus can be changed between the first camera and the second camera according to a movement of an object. In this case, a focus attribute for the object can be maintained without being changed.

Figure 14:
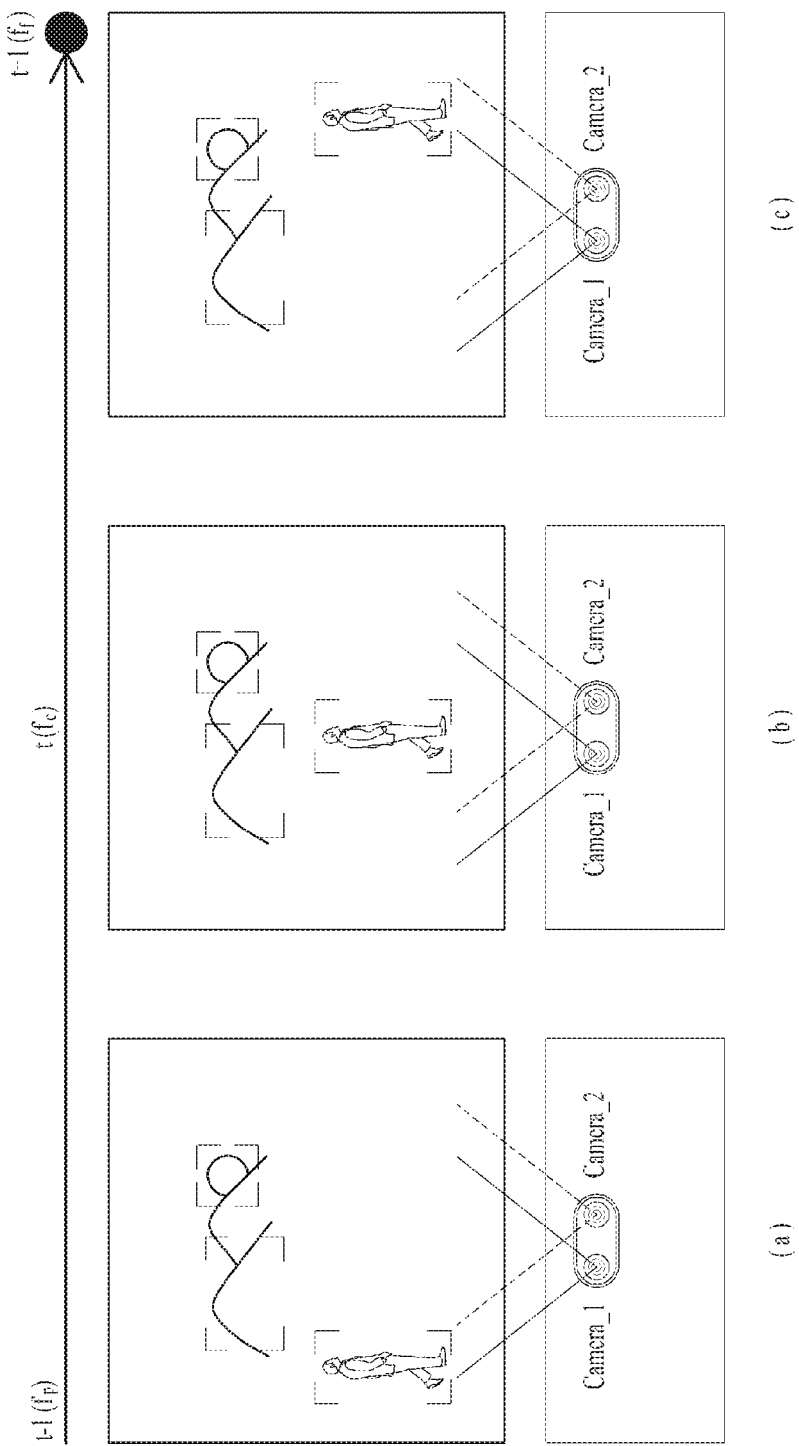
FIG. 14 is a diagram for explaining an image processing method according to a further different embodiment of the present invention.

FIG. 14 is a diagram for explaining an image processing method according to a further different embodiment of the present invention.

Unlike FIG. 13, FIG. 14a shows timing at which a preview window is provided or timing at which a camera application is activated, when a capturing signal is received at timing shown in FIG. 14c.

In other word, in FIG. 14, if a preview window is provided, capturing starts right after the preview window is provided. If a capturing signal is received at the timing shown in FIG. 14c, all image frames shown in FIGS. 14a to 14c are stored.

Unlike what is mentioned above, referring to FIG. 14a, it may be able to obtain an image from timing at which an object enters an angle of view of the first camera. In FIG. 14, focus switching or focus changing can be performed between cameras according to a movement of an object. In this case, a focus attribute for the object can be maintained without being changed.

For example, FIGS. 13 and 14 can be performed although a moving object is not a preferred target or a selected target.

Figure 15:
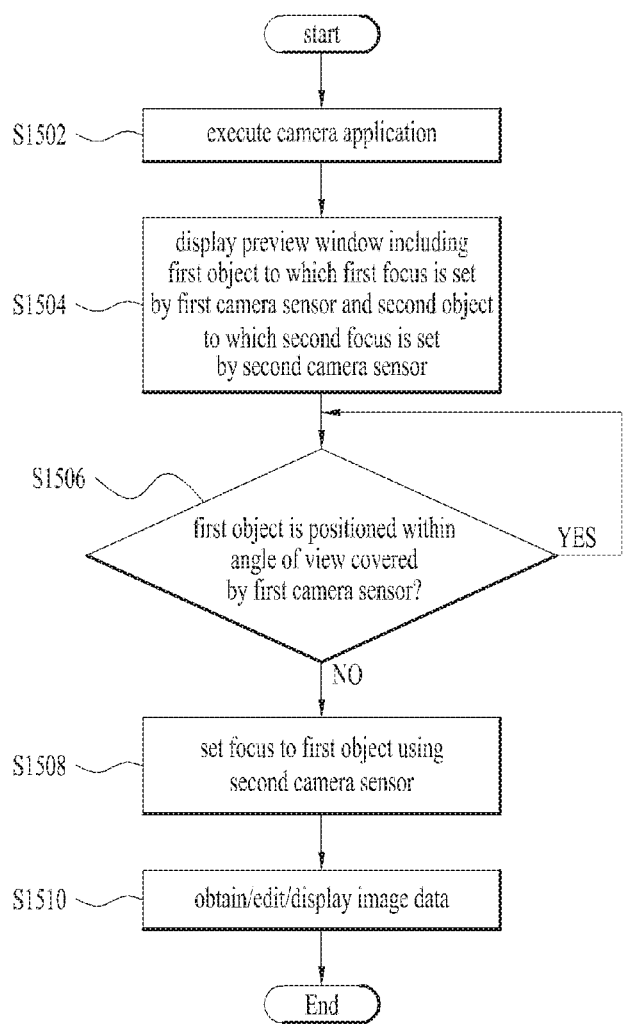
FIG. 15 is a flowchart for explaining a method for a terminal to process an image according to the present invention.

FIG. 15 is a flowchart for explaining a method for a terminal to process an image according to the present invention.

A method for a terminal to process data is explained with reference to FIG. 15 in the following.

A terminal automatically or manually executes a camera application [S1502]. If the camera application is executed, the terminal displays a preview window on a screen [S1504]. In this case, the preview window includes a first object to which a first focus is set by a first camera sensor and a second object to which a second focus is set by a second camera sensor.

If the first object corresponds to a moving object, the terminal tracks a movement of the first object. The terminal determines whether or not the first object is positioned within an angle of view covered by the first camera sensor based on the tracking [S1506].

Based on a result of the step S1506, if the first object is positioned at the outside of the angle of view covered by the first camera sensor, the terminal focuses on the first object using the second camera sensor [S1508].

Subsequently, the terminal obtains image data via the aforementioned procedure using the first camera sensor and the second camera sensor [S1510]. The obtained image data can be edited and a final image can be displayed via the screen.

In this case, a part not specifically explained may refer to the aforementioned contents. Explanation on contents overlapped with the aforementioned contents is omitted at this time.

The contents illustrated and described in the present specification can configure an independent invention. Although it is not explained in detail, it is apparent that at least two or more embodiments can be combined with each other to implement a new form. Hence, the combination may belong to the scope of right of the present invention.

The present invention can be applied to both video capturing and still image capturing via a terminal. Meanwhile, the terminal of the present specification may correspond to a controller of the terminal although it is not specifically explained.

According to at least one embodiment among various embodiments of the present invention, it is able to provide a terminal capable of obtaining an image preferred by a user using a plurality of focuses or multi-focus and an object tracking technology and a method of controlling therefor. According to the present invention, it is able to obtain an image preferred by a user via multiple focuses and focus switching between the multiple focuses. According to the present invention, it is able to obtain an image preferred by a user via a simple operation, eliminate an unwanted object from the image, and obtain a high-definition image for an object preferred by a user based on the aforementioned contents.

Meanwhile, the present invention can be implemented with a code readable by a computer in a recording media in which a program is recorded. The recording media readable by the computer may include all kinds of recording devices for storing data capable of being read by the computer system. The examples of the recording media readable by the computer may include a HDD (hard disk drive), an SSD (solid state disk), a ROM, a RAM, a CD-ROM, a magnetic tape, a floppy disc, an optical data storing device and the like. And, the computer may include a controller 180 of a terminal. While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A terminal, comprising:
   at least two or more camera sensors;
   a preview window configured to contain a first object to which a first focus is set by a first camera sensor and a second object to which a second focus is set by a second camera sensor and a display configured to display a processed image data; and
   a controller configured to:
   track a movement of the first object,
   if the first object is deviated from an angle of view covered by the first camera sensor, set a focus to the first object using the second camera sensor, and
   obtain image data,
   wherein:
   the first focus corresponds to a tracking focus;
   the second focus has a lock focus attribute; and
   if the first object is deviated from the angle of view covered by the first camera sensor and a focus is set using the second camera sensor, the controller is further configured to set a focus to the second object via the first camera sensor.

2. The terminal of claim 1, wherein the controller is further configured to control an initially configured focus attribute to be maintained although a focus of the first object and a focus of the second object are changed by a different camera sensor.

3. The terminal of claim 1, wherein if a capturing signal is received, the controller is further configured to control the image data to be obtained and wherein if the first object corresponds to a moving object, the controller is further configured to control an image data between a timing at which the preview window is provided and the first focus is set in a manner of being positioned within the angle of view of the first camera sensor and a timing at which the capturing signal is received to be additionally obtained.

4. The terminal of claim 1, wherein if a capturing signal is received, the controller is further configured to control the image data to be obtained and wherein if the first object corresponds to a moving object, the controller is further configured to control an image data between a timing at which the preview window is provided and the first focus is set in a manner of being positioned within the angle of view of the first camera sensor and a timing at which the capturing signal is received and a predefined time period after the capturing signal is received, or image data for a frame to be additionally obtained.

5. The terminal of claim 1, wherein the controller is further configured to obtain an edited image data by eliminating the first object of which the focus is changed by the second camera sensor from the obtained image data.

6. The terminal of claim 1, wherein if a zoom-in or zoom-out signal is received in a state that the preview window is provided, the controller is further configured to control the number of focuses set to the preview window or a range to be changed.

7. The terminal of claim 6, wherein the controller is configured to control at least one selected from the group consisting of resolution, brightness, ISO, shutter speed, and an aperture value to be differently configured for an object to which a corresponding focus is set after the number of focuses or the range is changed.

8. The terminal of claim 1, wherein the first object corresponds to a moving object.

* * * * *